United States Patent
Brekke

(10) Patent No.: US 9,428,993 B2
(45) Date of Patent: Aug. 30, 2016

(54) SYSTEM AND METHOD FOR CONTROLLING FLOW IN A PIPE USING A FINGER VALVE

(71) Applicant: Flowpro Well Technology A.S, Oslo (NO)

(72) Inventor: Kristian Brekke, Oslo (NO)

(73) Assignee: Flowpro Well Technology a.s., Oslo (NO)

( * ) Notice: Subject to any disclaimer, the term of this patent is extended or adjusted under 35 U.S.C. 154(b) by 0 days.

(21) Appl. No.: 14/549,160

(22) Filed: Nov. 20, 2014

(65) Prior Publication Data

US 2015/0184755 A1  Jul. 2, 2015

Related U.S. Application Data

(63) Continuation of application No. 13/425,399, filed on Mar. 20, 2012, now Pat. No. 9,085,956.

(51) Int. Cl.
| | |
|---|---|
| E21B 43/26 | (2006.01) |
| E21B 34/00 | (2006.01) |
| E21B 34/14 | (2006.01) |
| E21B 34/12 | (2006.01) |
| F16K 1/16 | (2006.01) |

(52) U.S. Cl.
CPC .............. *E21B 34/14* (2013.01); *E21B 34/12* (2013.01); *E21B 43/26* (2013.01); *F16K 1/16* (2013.01); *E21B 2034/007* (2013.01); *Y10T 137/0318* (2015.04)

(58) Field of Classification Search
CPC ........ E21B 34/12; E21B 43/26; E21B 34/14; E21B 2034/005; E21B 2034/007; Y10T 137/0318; F16K 1/16; F16K 1/165; F16K 1/18

USPC ........ 166/308.1, 332.1, 369, 334.1; 251/298, 251/212; 137/527.4

See application file for complete search history.

(56) References Cited

U.S. PATENT DOCUMENTS

| | | | | |
|---|---|---|---|---|
| 2,406,662 A * | 8/1946 | Burchett | ................. | F16L 29/00 |
| | | | | 137/527 |
| 6,039,117 A * | 3/2000 | Mueller | .................. | E21B 37/08 |
| | | | | 166/312 |
| 6,830,107 B2 * | 12/2004 | Allen | .................... | E21B 23/006 |
| | | | | 166/331 |
| 7,624,821 B1 * | 12/2009 | Hall | ........................ | E21B 21/08 |
| | | | | 175/231 |
| 2007/0114020 A1 * | 5/2007 | Brekke | .................. | E21B 43/08 |
| | | | | 166/236 |
| 2008/0000697 A1 * | 1/2008 | Rytlewski | ............... | E21B 43/14 |
| | | | | 175/317 |
| 2009/0071963 A1 * | 3/2009 | Johnson | ................. | A47B 77/18 |
| | | | | 220/476 |
| 2009/0183883 A1 * | 7/2009 | Fontenot, Jr. | ........... | E21B 34/12 |
| | | | | 166/373 |

* cited by examiner

*Primary Examiner* — Michael Wills, III
(74) *Attorney, Agent, or Firm* — Spradley PLLC; Michael Spradley

(57) ABSTRACT

Described herein is a system and method for controlling flow in a pipe string using a finger valve. Specifically, the disclosure describes a finger valve comprising a base pipe and a sliding sleeve. The base pipe can comprise a finger port, one or more fingers; and one or more hinges, each of the hinges connecting one of the fingers to the base pipe. The sliding sleeve can comprise a sliding sleeve having a first sleeve with in inner surface comprising a void and a depressor. The first sleeve can be positionable in a first position and a second position. In the first position, the depressor can push the one or more fingers into a closed position. In the second position, the void can rest at least one of the one or more fingers, allowing the at least one of the one or more fingers to move into an open position.

9 Claims, 9 Drawing Sheets

SYSTEM AND METHOD FOR CONTROLLING FLOW IN A PIPE USING A FINGER VALVE

PRIORITY

This application is a continuation application of utility application Ser. No. 13/425,399 filed Mar. 20, 2012.

BACKGROUND

This disclosure relates to a system and method for controlling flow in a pipe string using a finger valve.

The demand for natural gas and oil has significantly grown over the years making low productivity oil and gas reservoirs economically feasible, where hydraulic fracturing plays an important part in these energy productions throughout the world. For several decades different technology has been used to enhance methods for producing resources from oil and gas wells. Long horizontal wellbores with multiple fractures is one commonly used process to enhance extraction of oil and gas from wells. This process starts after a well has been drilled and the completion has been installed in the wellbore. Multi-stage fracking is a method that involves pumping large amounts of pressurized water or gel, a proppant and/or other chemicals into the wellbore to create discrete multiple fractures into the reservoir along the wellbore.

One of the technologically advanced methods being used today is simultaneous proppant fracturing of up to thirty fractures in one pumping operation. This method involves usage of proppant to prevent fractures from closing. However, this practice can usually cause an uneven distribution of proppant between the fractures, which will reduce the efficiency of the fracture system. As a result, this practice can also cause fractures to propagate in areas that are out of the target reservoir. Thus, such method can be inefficient and unsafe.

Additionally, proppant fracturing usually involves multiple steps and requires several tools in order to be performed successfully. Such practice that will allow even distribution of proppant between fractures, highly depends on setting plugs between the fracture stages or using frack balls of increasing sizes. In these methods, plugs are either set after each fracture has been perforated and pumped, or frack balls are dropped from the surface to successively open fracturing valves placed along the well. For each stage, balls of different diameters are dropped into the well corresponding to a specific fracturing valve's seat. At a point in the well, the ball will no longer pass through due to a decrease in well diameter. Once the ball is in place, fracking can take place. After fracking, the plugs must be drilled out and the balls must be recovered. With each fracturing stage while setting plugs, much time and energy is expended in tripping out of the hole between the stages and drilling out the plugs. Moreover, land-based rigs are usually rented per day basis, and so any delays can be quite expensive. Also, only about 12 different fracture stages is possible with the ball method before a restriction in flow area due to small ball diameter makes fracturing difficult due to large pressure losses.

As such it would be useful to have a system and method for controlling flow in a pipe string using a finger valve.

SUMMARY

Described herein is a system and method for controlling flow in a pipe string using a finger valve. Specifically, the disclosure describes a finger valve comprising a base pipe and a sliding sleeve. The base pipe can comprise a finger port, one or more fingers; and one or more hinges, each of the hinges connecting one of the fingers to the base pipe. The sliding sleeve can comprise a sliding sleeve having a first sleeve with in inner surface comprising a void and a depressor. The first sleeve can be positionable in a first position and a second position. In the first position, the depressor can push the one or more fingers into a closed position. In the second position, the void can rest at least one of the one or more fingers, allowing the at least one of the one or more fingers to move into an open position.

The disclosure also describes a method for controlling flow in a pipe string using a finger valve, comprise the steps connecting a base pipe within a pipe string, and actuating a sliding sleeve from a first position to a second position. The base pipe can comprise a finger port, one or more fingers; and one or more hinges, each of the hinges connecting one of the fingers to the base pipe. The sliding sleeve can comprise a first sleeve having an in inner surface with a void and a depressor. In the first position, the depressor can push the one or more fingers into a closed position. In the second position, the void can rest at least one of the one or more fingers, allowing the at least one of the one or more fingers to move into an open position.

DETAILED DESCRIPTION

Described herein is a system and method for controlling flow in a pipe string using a finger valve. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
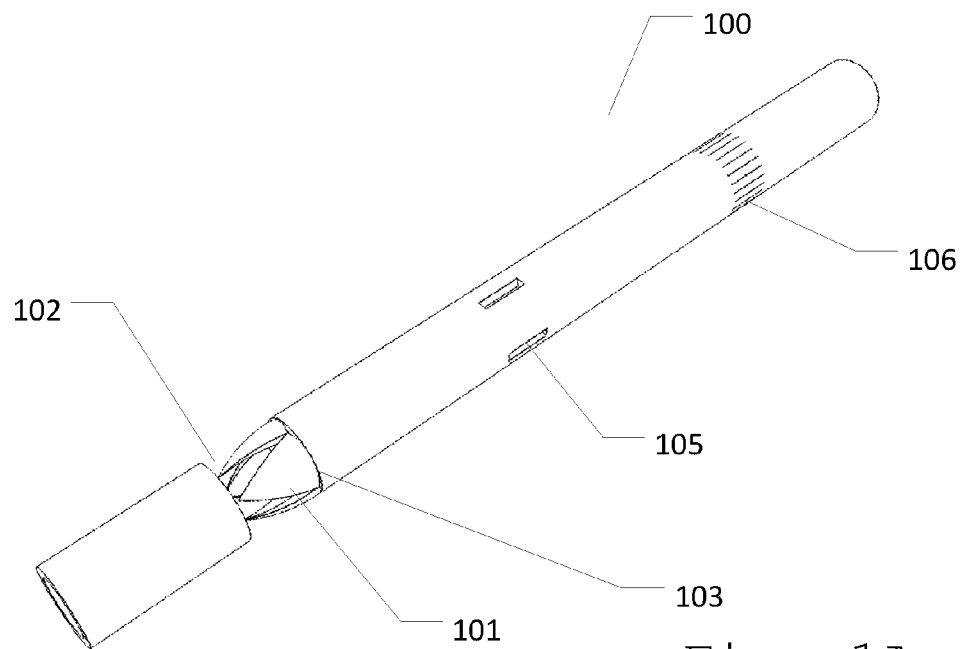
FIG. 1A illustrates a side view of a base pipe.
Figure 1B:
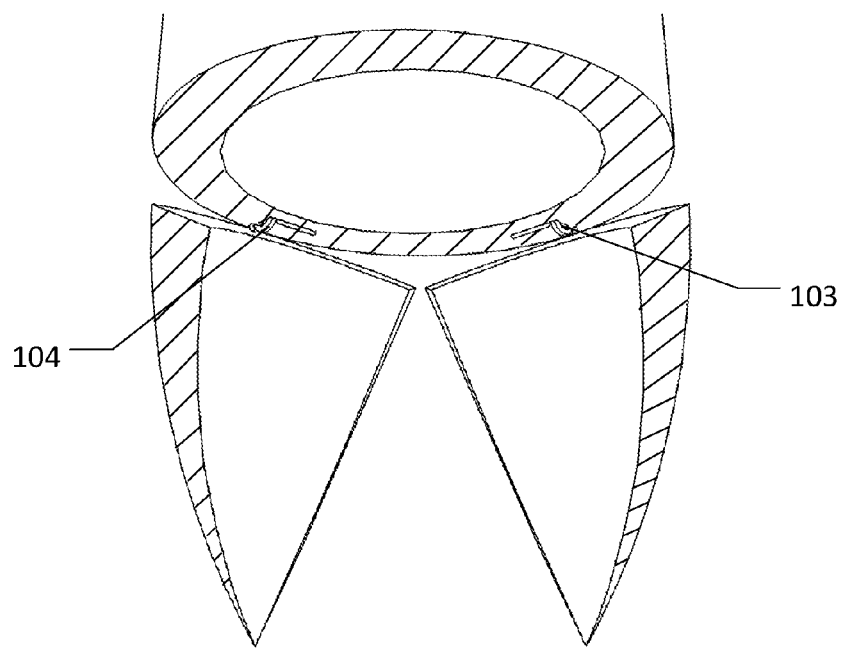
FIG. 1B illustrates a front view of a base pipe.

FIG. 1A illustrates a side view of a base pipe 100. Base pipe 100 can be connected as a portion of a pipe string. In one embodiment, base pipe 100 can be cylindrical, and can comprise a finger 101 and a finger port 102. FIG. 1B illustrates finger 101 connected Finger 101 can connect to base pipe 100 by a hinge 103. In one embodiment, a first biasing device 104 can also connect base pipe 100 to finger 101. In another embodiment, first biasing device 104 can operationally be a part of hinge 103. Biasing device 104 can be a spring. By connecting first biasing device to finger 101 and base pipe 102, finger can be biased to an open or closed position. For exemplary purposes, this disclosure illustrates finger 101 biased in an open position. In another embodiment, biasing device 104 can be a portion of finger 101 and/or base pipe 100 that has been magnetized to bias finger 101 into an open or closed position. In one embodiment, base pipe 100 can also comprise a first portion of fracking port 105 and/or a production port 106. First portion of fracking port 105 can be made of one or more openings, and production port 106 can also be made of one or more openings in base pipe 100.

Figure 1C:
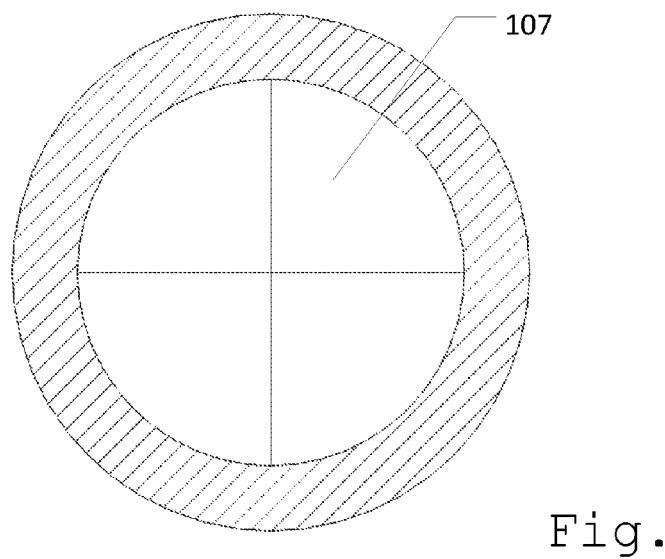
FIG. 1C illustrates a cross sectional view of a base pipe.

FIG. 1C illustrates a front view of base pipe 100. Base pipe 100 can further comprise a chamber 107. When fingers 101 are in an open position, chamber 107 can be an empty space or an opening that can allow materials to pass through. However, when fingers 101 are in a closed position, the fingers 101 come together to create a significant or complete blockage to chamber 107, substantially or completely preventing materials from passing through base pipe 100.

Figure 1D:
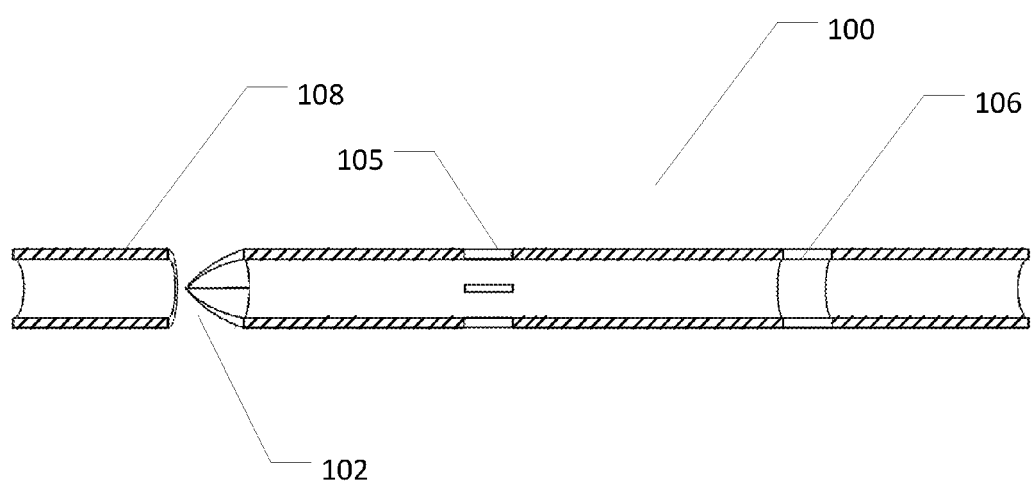
FIG. 1D illustrates a cross sectional of a base pipe.

FIG. 1D illustrates a cross sectional of a base pipe 100 further comprising base ring 108. In one embodiment finger port 102 can be a plurality of orifices spaced radially around base pipe 100. In another embodiment finger port 102 can be a cylindrical segment missing from base pipe 100. First portion of fracking port 105 can be circularly placed around the middle part of base pipe 100. Production port 106 can be circularly placed around the rear portion of base pipe 100.

Figure 2A:
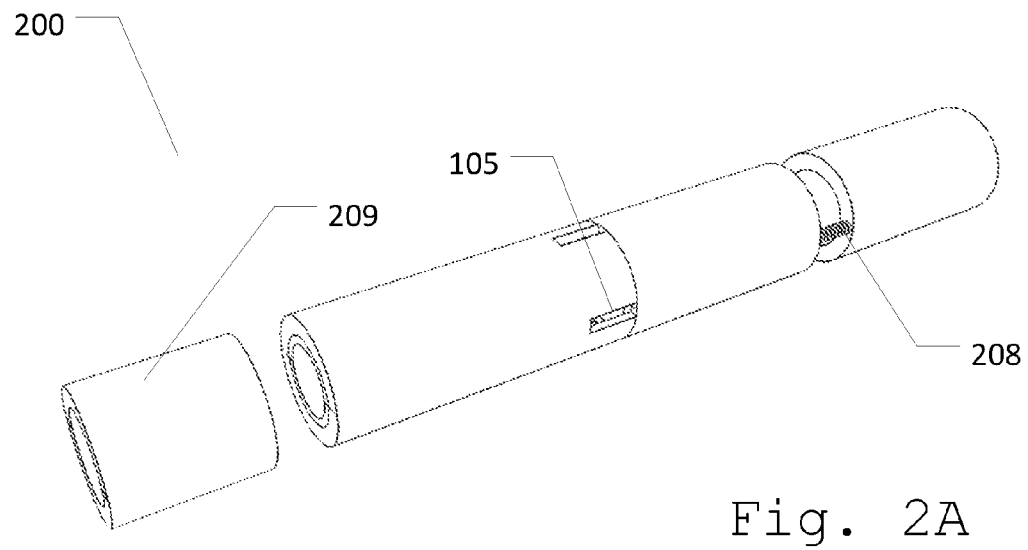
FIG. 2A illustrates a sliding sleeve connected to a fixed sleeve by an actuator, and in line with an outer ring.
Figure 2B:
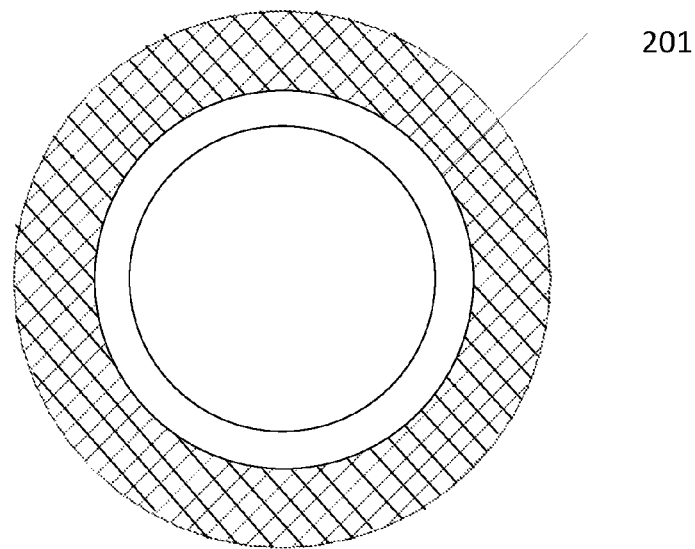
FIG. 2B illustrates a front view of a sliding sleeve.

FIG. 2A illustrates a sliding sleeve 200 connected to a fixed sleeve by an actuator 208, and in line with an outer ring 209. In one embodiment, sliding sleeve 200 can be a cylindrical material that can comprise a second portion of fracking port 105. In one embodiment, sliding sleeve 200 can have an opening large enough to fit base pipe 100. FIG. 2B illustrates a front view of a sliding sleeve 200. Sliding sleeve 200 can further comprise a sleeve chamber 201. Sleeve chamber 201 can be an opening large enough to house base pipe 100.

Figure 2C:
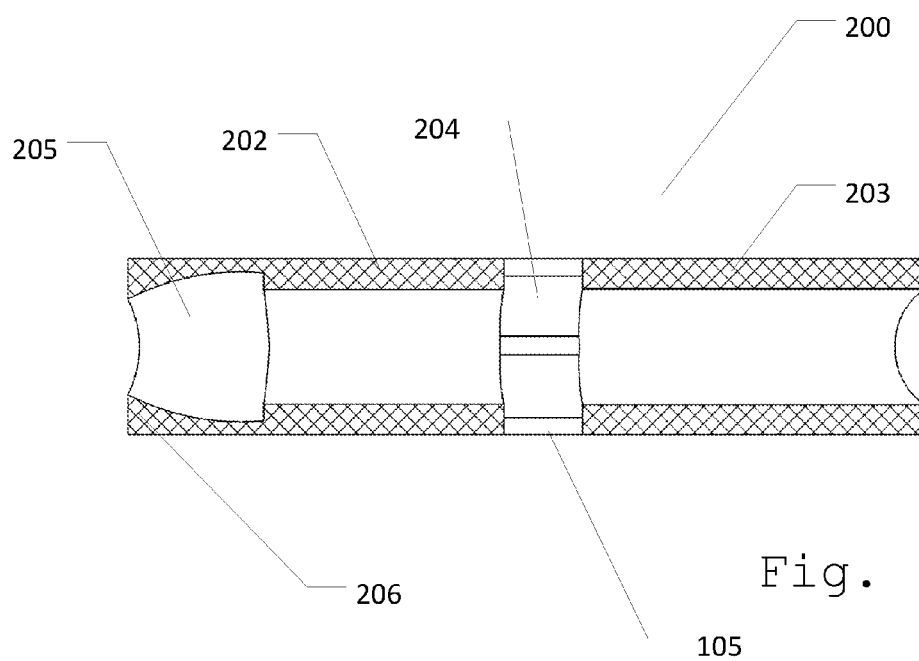
FIG. 2C illustrates a cross sectional view of a sliding sleeve.

FIG. 2C illustrates a cross sectional view of a sliding sleeve 200. Sliding sleeve 200 can comprise a first sleeve 202 and a second sleeve 203. Further, first sleeve 202 and a second sleeve 203 can be attached through one or more curved sheet 204, the spaces between each curved sheet 204 defining a portion of fracking port 105. Inner surface of first sleeve 202 can comprise surface attributes that interact with one or more fingers 101. Surface attributes can comprise a first attribute and a second attribute. First attribute can be one or more voids 205 and second attribute can be a depressor 206 capable of moving finger 101 to a closed position. Void 205 can extend radially around the complete inner diameter of base pipe 100, partially around the inner diameter, or local to a single radial position. If completely around the inner diameter, the ends of inner surface can have a smaller diameter than the void. If local, void 205 can comprise a plurality of local depressions positioned radially around the inner surface of sliding sleeve 200.

Figure 2D:
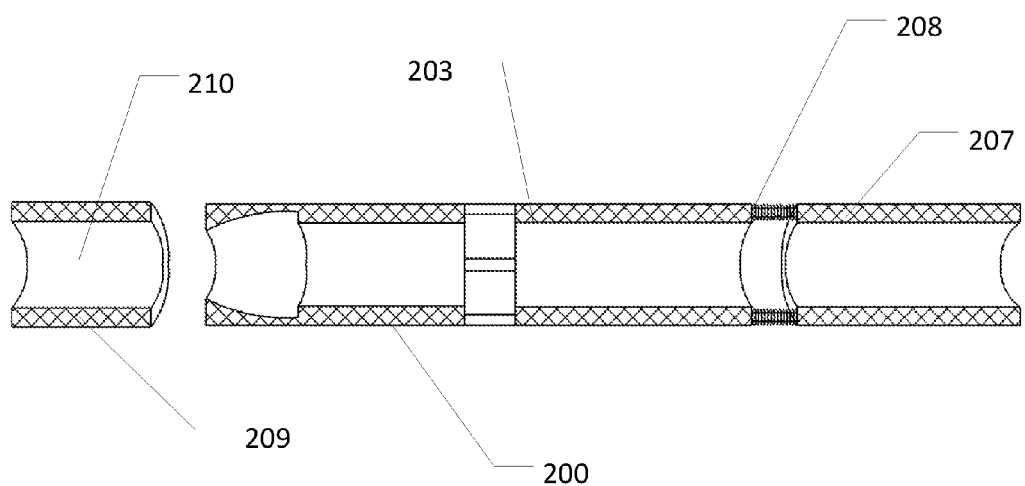
FIG. 2D illustrates a cross sectional view of a sliding sleeve that further comprises a fixed sleeve, and an actuator.

FIG. 2D illustrates a cross sectional view of a sliding sleeve 200 further comprising fixed sleeve 207, connected to fixed sleeve 207 by actuator 208, and in line with outer ring 209. In one embodiment, actuator 208 can be a biasing device such as a spring. Second sleeve 203 of sliding sleeve 200 can be attached to fixed sleeve 207 using actuator 208. In one embodiment wherein actuator 208 is a biasing device, sliding sleeve 200 can be pulled towards fixed sleeve 207, thus compressing or otherwise load biasing device 208 with potential energy. Later biasing device 208 can be released or otherwise instigated, pushing sliding sleeve 200 away from fixed sleeve 207. In another embodiment, actuator 208 can retrieve sliding sleeve 200 to its original position. Fixed sleeve 207 is depicted in the above figures as a cylinder, but in practice may not be a continuous loop. Instead, fixed sleeve 207 may be any device or devices connected to base pipe 100 that gives actuator 208 a foothold to push connect to or push against to actuate sliding sleeve 200. In one embodiment, fixed sleeve 207 can be a component of actuator 208.

Figure 3A:
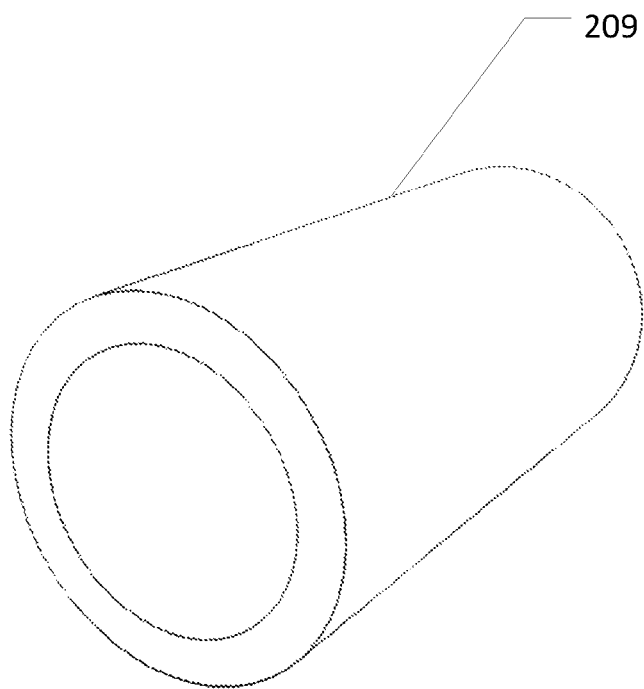
FIG. 3A illustrates a peripheral view of an outer ring.
Figure 3B:
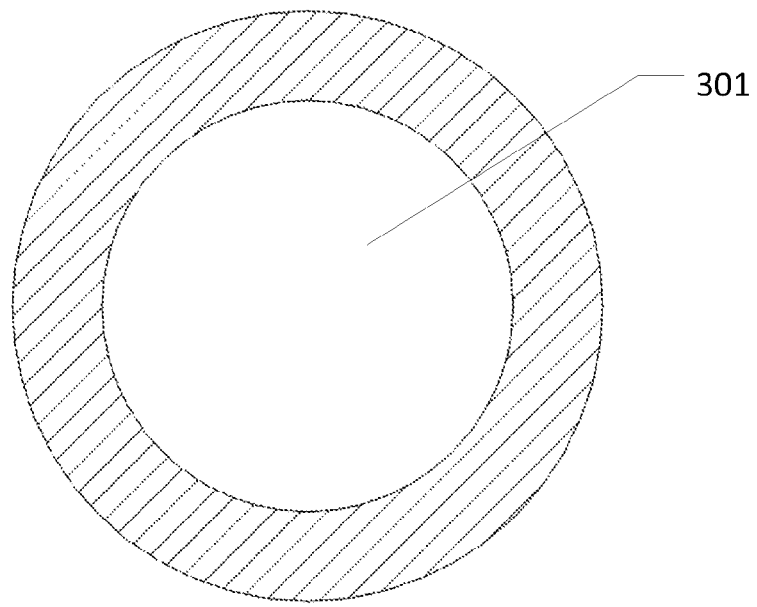
FIG. 3B illustrates a front view of an outer ring.

FIG. 3A illustrates a peripheral view of outer ring 209. In one embodiment outer ring 209 can be a solid cylindrical tube forming a ring chamber 301, as seen in FIG. 3B. In another embodiment, outer ring 209 can be attached to base ring 108 of base pipe 100. In one embodiment outer ring 209 can be an enclosed solid material forming a cylindrical shape. A ring chamber 301 can be the space formed inside outer ring 209. Ring chamber 301 is large enough to slide over base pipe 100. Outer ring 300 can be fixed to base pipe 100. In one embodiment, outer ring 209 can be used to halt forward progress of sliding sleeve 200 during actuation.

Figure 4A:
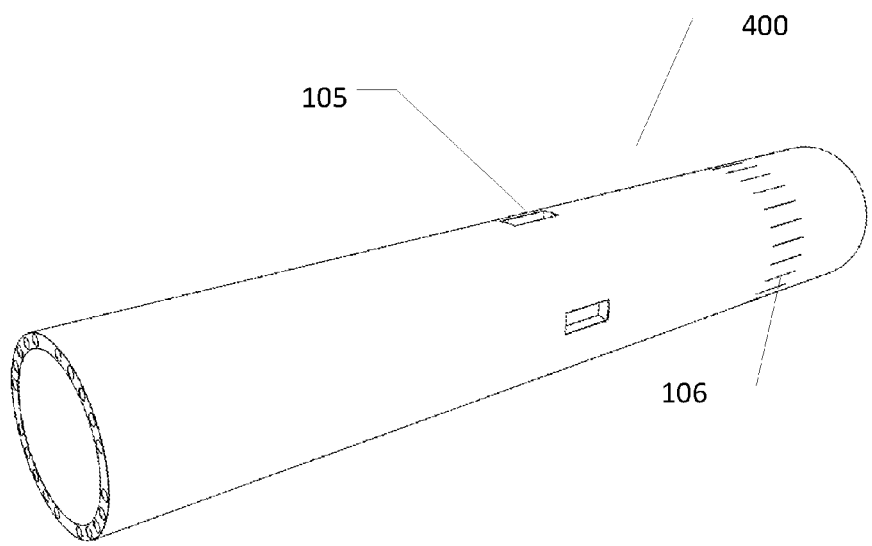
FIG. 4A illustrates a valve casing.
Figure 4B:
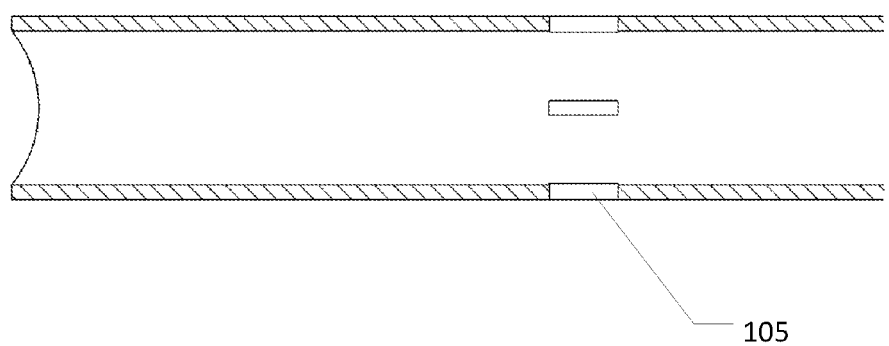
FIG. 4B illustrates a fracking port of a valve casing
Figure 4C:
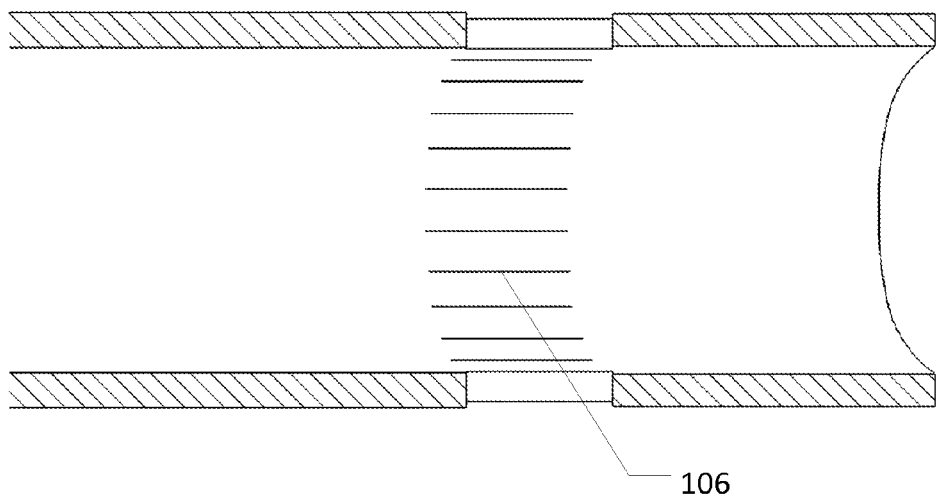
FIG. 4C illustrates a production slot of a valve casing.

FIG. 4A illustrates a valve casing 400. In one embodiment, valve casing 400 can be a cylindrical material, which can comprise a third portion of fracking port 105, and production port 106. As such third portion of fracking port 105 can be a plurality of openings circularly placed around valve casing 400, as seen in FIG. 4B. Further, production port 106 can be one or more openings placed around valve casing 400, as seen in FIG. 4C.

Figure 5:
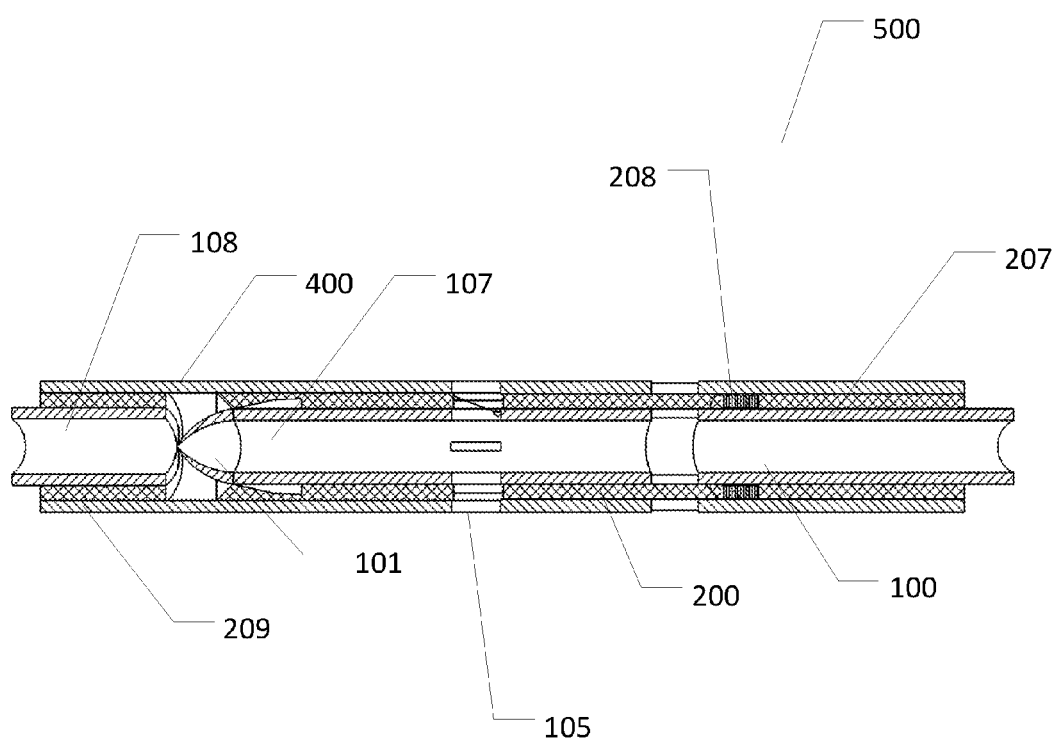
FIG. 5 illustrates a finger valve in a closed mode.

FIG. 5 illustrates a finger valve 500 in a closed mode. In an embodiment wherein fracturing valve 500 can be used in fracturing a well, fracturing valve 500 can comprise base pipe 100, sliding sleeve 200, outer ring 300, and/or valve casing 400. In such embodiment, base pipe 100 can be an innermost layer of finger valve 500. A middle layer around base pipe 100 can comprise outer ring 300 fixed to base pipe 100 and sliding sleeve 200, wherein fixed sleeve 207 is fixed to base pipe 100. Finger valve 500 can comprise valve casing 400 as an outer layer. Valve casing 400 can, in one embodiment, connect to base ring 108, outer ring 209 and fixed sleeve 207. In a fracking position, fracking port 105 can be aligned and open, due to the relative position of base pipe 100 and sliding sleeve 200.

At an open state, biasing device 208 can be in a loaded state further moving the hinges and pushing finger 101 into chamber 107. In such state, finger 101 can be in a closed form, blocking the path of fluid in chamber 107. Finger valve 500 can be useful in fracturing a well, for example, as shown in FIG. 5, in a closed state fracking port 105 will be open, allowing flow of proppant from chamber 107 through fracking port 105 and into a formation, thereby allowing fracturing to take place.

Figure 6:
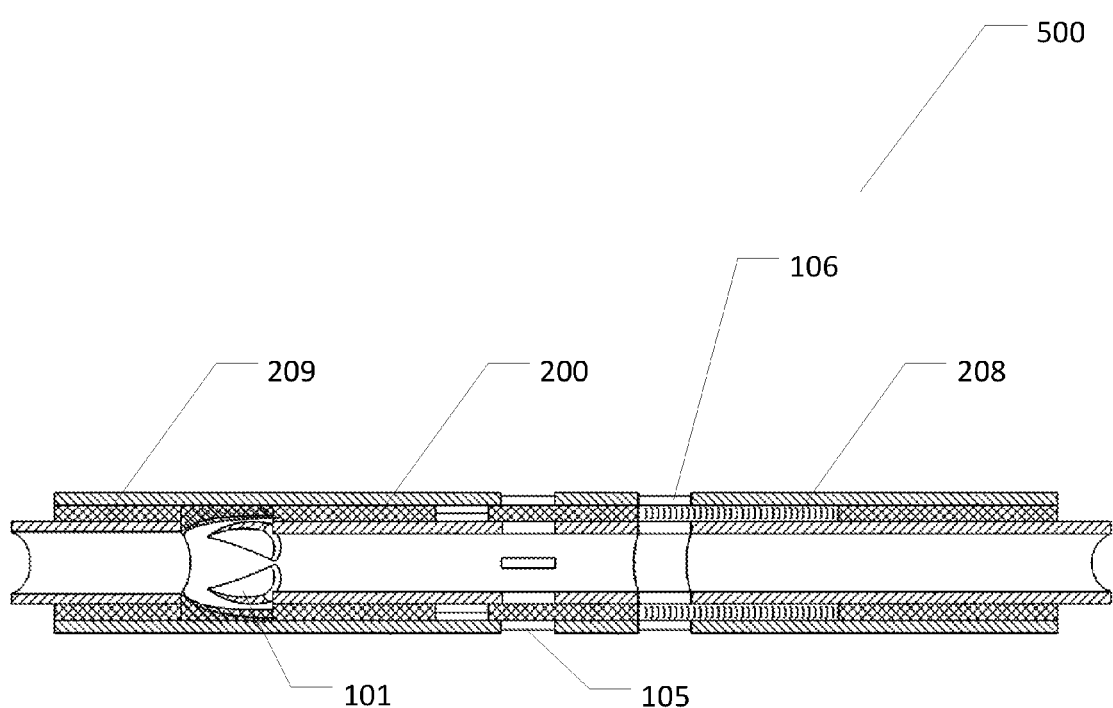
FIG. 6 illustrates a finger valve in an open mode.

FIG. 6 illustrates finger valve 500 in open mode. As sliding sleeve 200 is pushed towards outer ring 209 by biasing device 208, finger 101 can be pushed to rise up.

When used in well fracturing, sliding sleeve 200 can concurrently close fracking port 105 and open production port 106, allowing materials to pass through base pipe 100. Once production port 106 is opened, extraction of oil and gas can start. In one embodiment, a plurality of finger valves 500 can be put in a well. After one has been used to fracture a well, another can be used downstream. In such embodiment, each production port can have a check valve to allow fracking to continue downstream without pushing frack fluid through the production port.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A finger valve comprising
   a base pipe comprising
      a finger port;
      one or more fingers; and
      one or more hinges, each of said hinges connecting one of said fingers to said base pipe; and
   a sliding sleeve comprising
      a first sleeve having an in inner surface, said inner surface comprising a void and a depressor, said first sleeve maneuverable into
         a first position, wherein said depresser pushes said one or more fingers into a closed position; and
         a second position, wherein said void rests over one of said one or more fingers, allowing said one or more fingers to move into an open position.

2. The finger valve of claim 1, wherein said one or more fingers comprises two or more fingers.

3. The finger valve of claim 1 further comprising one more first biasing devices, each of said first biasing devices biasing one or more of said fingers to an open position.

4. The finger valve of claim 3, wherein at least one of said first biasing devices is a structural component of one of said hinges.

5. The finger valve of claim 3, wherein at least one of said first biasing devices is a spring.

6. The finger valve of claim 3, wherein at least one of said biasing devices is a magnetized portion of one of said fingers.

7. The finger valve of claim 3, wherein at least one of said biasing devices is a magnetized portion of said first sleeve.

8. The finger valve of claim 1, wherein said void comprises a plurality of depressions, each depression allowing one or more of said one or more fingers to move into said open position.

9. A method for controlling flow through a pipe string comprising the steps connecting a base pipe within a pipe string, said base pipe comprising
   a finger port;
   one or more fingers; and
   one or more hinges, each of said hinges connecting one of said fingers to said base pipe; and
   actuating a sliding sleeve from a first position to a second position, said sliding sleeve comprising a first sleeve, said first sleeve comprising an in inner surface, said inner surface comprising a void and a depressor, wherein in
   said first position, said depresser pushes said one or more fingers into a closed position; and
   said second position, said void rests over one of said one or more fingers, allowing said one or more fingers to move into an open position.

* * * * *